Dec. 24, 1957      E. E. SOEHNGEN      2,817,238

MICROMANOMETER

Filed April 19, 1956

INVENTOR.
ERICH E. SOEHNGEN

BY Wade Koontz and
Lloyd B. Stevens, Jr.
ATTORNEYS

2,817,238
MICROMANOMETER

Erich E. Soehngen, Dayton, Ohio

Application April 19, 1956, Serial No. 579,412

12 Claims. (Cl. 73—401)

(Granted under Title 35, U. S. Code (1952), sec. 266)

The invention described herein may be manufactured and used by or for the United States Government for governmental purposes without payment to me of any royalty thereon.

This invention relates to a micromanometer having much higher sensitivity than commercially available micromanometers without being subject to the same difficulties in the manufacture thereof and the operation of the instrument.

Micromanometers are devices for measuring minute differences of pressures within gases or liquids as are observed in many fields of physics, chemistry and engineering research. A special application of micromanometers is the determination of the velocity of gases or liquids through pressure measurements, especially in such systems where the expression: velocity times density is very low. This may be the case in high speed flight at very high altitudes, low speed flow of gases rising from heated surfaces or creeping flow of liquids. For example, a pressure difference of approximately one micron of a water column (1/25,000 inch) indicates nearly sound velocity at an altitude of 350,000 feet, but this pressure also is indicative of a speed of 12 feet per minute of air rising from a hot plate at low altitudes.

Principally micromanometers are modified versions of conventional liquid-filled U-tube manometers which indicate pressure differences by the differences of height of the fluid level in both manometer legs. Thus measurement of pressures is reduced to the measurement of the displacement of the level of a fluid.

The difficulties in measuring small pressure differentials increase with the required sensitivity of the measuring device. Various methods have been developed to magnify the small displacements of the fluid levels in order to produce accurate and reproducible readings of the changes involved. Some of them use floats and microscopic systems to obtain instantaneous readings, or observe the meniscus of the fluid levels in glass tubes through magnifying optical systems; others counteract the changes of the fluid levels by mechanical means and evaluate the resulting mechanical motions in terms of pressure differences. However, most of the methods proposed and tried so far are subject to serious limitations such as may be induced by effects of capillary forces, wetability of the manometer walls, resolving power of optical systems, tolerances in mechanical systems, etc. Therefore, the reproducibility of data obtained with most commercially available manometers is hardly better than approximately ±1/2,000 inch which limits the practical sensitivity to approximately 0.001 inch.

The new micromanometer as described by this invention exhibits considerable improvements with respect to reproducibility, and shows a considerable increase in sensitivity, which may be larger by a factor of 100 exceeding that of existing micromanometers.

This invention is based on the utilization of the phenomenon of light interference for the measurement of small displacements of fluid levels as occur in micromanometers. Generally, by the interference method, the dimensions to be measured are compared with the wave length of light. This is usually done by means of two coherent light beams which travel on different paths, the length of which are influenced by the dimension to be measured, to a point of reunification. There, any differences of the optical path lengths of both beams—resulting in relative phase shifts—can be detected by interference effects. A series of interference fringes may be observed; the relative position of each with respect to the "zero-order" fringe which is seen only, if both path lengths were exactly alike, is an indication of the differences of the respective path lengths. This method has found wide application for the precision length measurement of solid bodies like gages, optical equipment, etc. Thus, since the wave length of light is of the order of 1/50,000 inch, the interference method is applicable to measurements of linear dimensions of similar order.

It is a primary object of this invention to provide a manometer coupled with an interferometer in such a fashion that a micromanometer, having an extremely high sensitivity and good operating characteristics, is provided.

This and other objects of the invention will become apparent as the detailed description of the invention proceeds.

By the invention a micromanometer of extremely high sensitivity and good operating characteristics is provided. The liquid level measurements in the manometer are preferably conducted in one leg of the manometer and in this liquid-level measuring leg a mirror is positioned substantially horizontally in the liquid of the leg for reflecting the portion of the interferometer light beam which falls thereon. One or more other legs called liquid-containing legs are provided for the manometer. The reason for providing more than one additional leg for the manometer is to make the sensitivity of the manometer adjustable. For the manometer to operate of course it is necessary to provide a connection between the legs of the manometer below the liquid levels therein, so the liquid in each leg will tend to seek the same level when no differential pressure is applied to the manometer. Normally the connections between the legs will be provided at the bottoms of the legs. An interferometer is positioned to operate in cooperation with the liquid-level measuring leg of the manometer, i. e., the leg containing the mirror. A light source is provided for or as a part of the interferometer, and means are provided to direct one portion of the light from the light source into the first leg of the manometer above the level of the liquid therein and through the liquid onto the mirror therein. A second mirror is provided as a part of the interferometer, and means are provided to direct a second portion of the light from the light source onto the second mirror. Means are provided to combine reflected light from the two mirrors, and means are provided to view the combined reflected light from the mirrors as an indication of the differential pressure applied to the micromanometer. If a constant temperature bath or jacket is not provided surrounding the micromanometer, it is preferred to operate the micromanometer in a room regulated to a constant temperature for maximum accuracy.

The invention will be more clearly understood from the following detailed description of specific embodiments thereof read in conjunction with the accompanying drawings wherein.

Figure 1:
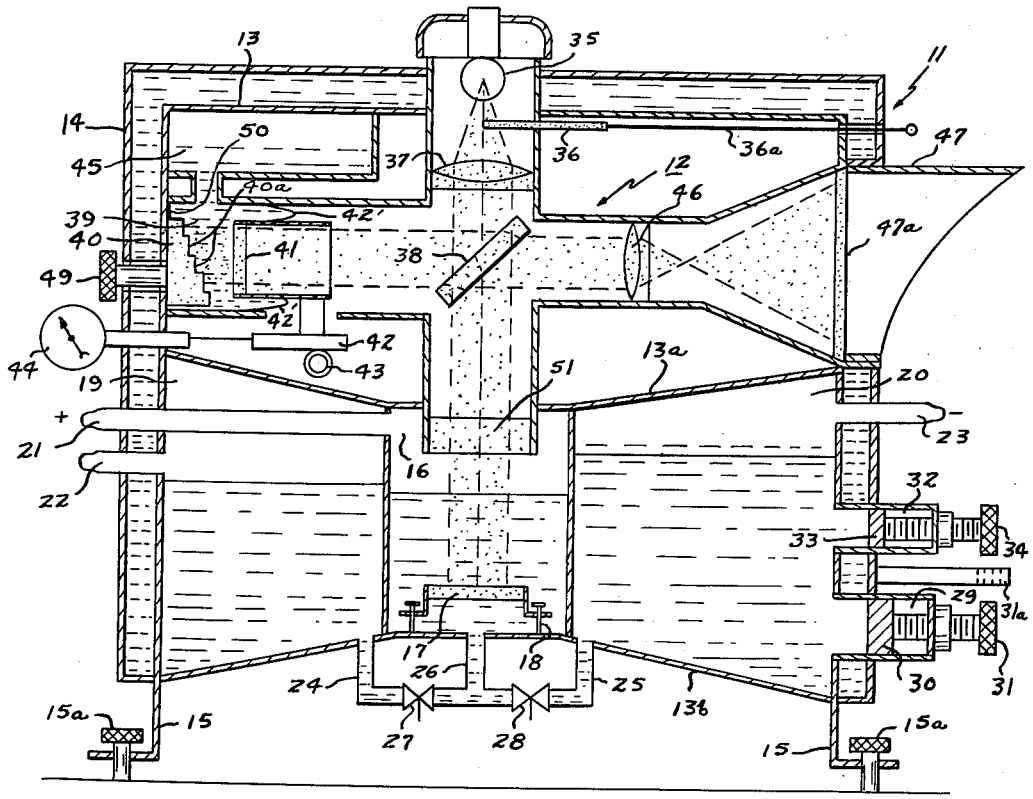
Fig. 1 is a schematic elevational view partially in section of the entire apparatus.

Micromanometer 11 will be particularly described with respect to Fig. 1 which shows the entire apparatus. Container 13 holds the micromanometer including as a part interferometer 12. A concave top 13a and concave bottom 13b is provided as a part of the container for added structural strength in the event that i tis desired to operate the micromanometer at high pressure levels though small differential pressures. Jacket 14 surrounds the micromanometer to provide an annular space wherein water or other heat exchange fluid maintained at a constant temperature may be circulated to maintain the micromanometer at a constant temperature, thereby increasing the accuracy of the instrument. Supports 15 are provided having set screws 15a therein for the purpose of levelling the micromanometer.

Leg or compartment 16 is provided in the container by suitable partitioning as the liquid-level measuring leg of the manometer. In this leg near the bottom thereof is positioned mirror 17. This mirror is positioned substantially horizontally in the leg with levelling screws 18 for the purpose of adjusting the level or tilt of this mirror. Tube 21 communicates with the vapor space of compartment or leg 16, and may be considered as a narrowing down or extension of this compartment. Legs or compartments 19 and 20 are provided concentrically around leg 16. These legs 19 and 20 form the other leg of the manometer, and connections to their vapor spaces are made by tubes or extensions thereof 22 and 23, respectively. If it is desired to use both legs 19 and 20 as the second leg of the manometer, the vapor spaces of these two legs will be connected by externally connecting the extension of these legs, namely tubes 22 and 23. Legs 19 and 20 are externally connected to leg 16 below the liquid levels of the legs via conduits 24 and 25, respectively, which interconnect with conduit 26 which is an extension or narrowing of leg 16. Valves 27 and 28 are provided in conduits 24 and 25, respectively, for the purpose of separating either one of the legs 19 or 20 from the system, if desired. Also these valves, when partially closed, are useful for the purpose of damping pressure fluctuation in the system.

Piston 30 operating in cylinder 29 provides a means for adjusting the levels of liquid in the various legs 16, 19 and 20 of the manometer. This piston 30 is operated by a calibrated micrometer screw 31 for the fine adjustment in level. Measurement of the level adjustment is indicated by the position of screw 31 with respect to calibrated scale 31a. A similar piston 33 and cylinder 32, both of smaller cross section than the one previously referred to, operated by calibrated micrometer screw 34 is provided for the purpose of allowing even finer adjustment of the liquid level of the manometer. The single scale 31a with separate calibrations thereon for each piston can be used as the reference for both pistons or a separate scale can be used for each piston. These pistons operating within their cylinders are useful for adjusting the zero level of the manometer and may later be useful for resetting the level in leg 1 of the manometer back to the zero position after pressure is applied to the manometer. In the latter case the pressure measurement is obtained from the change in position of the screw which operates the piston rather than by the interferometer, except that the interferometer is used to indicate that zero level has again been reached.

Interferometer 12 is shown positioned within the container. The interferometer could be located outside the container, but it is preferred to at least locate cell 39 inside the container, so the liquid in the cell will be brought to the same temperature as the liquid in the manometer by the constant temperature jacket. Light source 35 is provided for the interferometer. Filter 36 which can be a green filter is shown positioned in one-half of the beam emitted by the light source for the purpose of giving a substantially monochromatic light beam for one-half the light. Filter 36 could be positioned in front of or behind lens 46 or behind lens 37 in the combined light and accomplish the same purpose as in its indicated position. Rod 36a operable through a sleeve in the jacket is attached to filter 36, so the filter can be completely removed from the light beam, inserted into one-half the light beam as shown or inserted to filter the entire light beam. There are conditions of operation of the manometer, when each of these filter positions may be the preferred position. White light alone gives a very distinct "zero-order" fringe distinguishable easily from adjacent fringes which rapidly fade in darkness as they are more remote from the "zero-order" fringe; whereas, a substantially monochromatic light source gives a "zero-order" fringe which may be hard to distinguish from other fringes. However, monochromatic light gives a large number of fringes increasing the range of pressure that can be measured by counting interference fringes over that when using white light. Lens 37 is provided for collimating the light beam and projecting it on beam splitter 38. Beam splitter 38 divides the light beam into two portions sending one portion of the light beam through glass plate 51 into leg 16 above the liquid level therein, through the liquid in the leg onto mirror 17. Glass plate 51 is provided in the interferometer to seal the parts of the interferometer away from the manometer portion and yet provide a light path into the measuring leg of the manometer. The second portion of light from the beam splitter 38 is projected into cell 39 which is filled with liquid, preferably the same liquid as is in the manometer, onto mirror 40.

Mirror 40 is composed of a multiplicity of parallel mirrored surfaces arranged consecutively by steps in different planes. The length of liquid in cell 39 through which the light must pass in reaching mirror 40 is adjustable by means of movable glass plate 41 which is sealed by flexible diaphragm means 42' closing the cell. The movement of plate 41 can be very accurately controlled by rack 42 and pinion 43. The movement of plate 41 is indicated on dial or gage 44, which cooperates with the rack and pinion means. By dial 44 it is possible to tell the length of liquid through which the light must pass in reaching mirror 40. By the use of this adjustable length cell it is possible to adjust the length of liquid through which the light must pass in reaching mirror 40 to be exactly equal to the length of liquid through which the light must pass in reaching mirror 17. Thereby, it is possible to make the light paths of the two portions of light exactly identical. Thus a zero level reading would be obtained with the interferometer by operating the instrument in such a fashion. The differential pressure will be indicated on dial 44 rather than by counting the number of interference fringes with the interferometer. Chamber 45 is provided as an overflow chamber for cell 39 to insure that regardless of the adjustment of the length of the cell the liquid level of the cell will always be above mirror 40.

Light reflected from mirrors 17 and 40 is reflected upon beam splitter 38 and combined thereby and projected on lens 46 which focus the light for viewing through on ground glass plate 47a. Viewing hood 47 is provided to shield the ground glass plate for better viewing. The interference fringes of the light can be viewed and the pressure differential applied to the manometer indicated by the number of interference fringes. Alternatively, the instrument can be adjusted to show the zero-order fringe, and the pressure determination made as previously described.

Instead of using viewing hood 47 to visually view the combined reflected light in the interferometer, it may be desirable to replace the viewing hood with photoelectric cell 48 connected to conventional, amplifying and counting equipment to count the number of interference fringes as an indication of the differential pressure applied to the manometer. The photoelectric cell will count the interference fringes as the level changes from zero level to the level caused by the pressure applied to the manometer. The photoelectric cell could also replace ground glass 47a, but this glass can be left in place replacing only the hood by the photoelectric means.

The sensitivity of the interferometer portion of the micromanometer can be increased by attaching a micrometer screw 49 to mirror 40. Screw 49 projects through a sleeve in the jacket 14 and is threaded into container 13. The mirror is then tilted on hinge 50 causing the interference fringes of the reflected combined light to alter spacing and so to change the sensitivity of the interferometer.

The purpose of the multiple mirrored surfaces 40a on mirror 40 is to indicate in which direction the instrument should be adjusted to bring it into zero-level adjustment and to increase the useful pressure range of the micromanometer. For example, if after the application of the differential pressure to be determined the interference fringes appear in the upper half of plate 47a rather than in the center of the plate, it is known that plate 41 must be moved away from mirror 40 to bring the interferometer back into zero-level adjustment. This adjustment is required to make the light path in the liquid to the center step of mirror 40 the same as in the liquid to mirror 17. Also knowing the distance between each step of mirror 40, e. g. 50 microns, it is possible to quickly roughly estimate the differential pressure applied to the manometer by observing the step on which the interference fringes appear.

Figure 3:
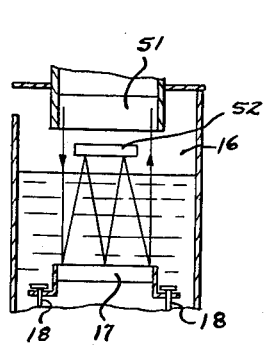
Fig. 3 is a schematic view of an embodiment of the invention to increase the sensitivity of the micromanometer.
Figure 2:
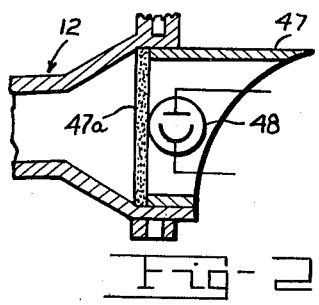
Fig. 2 is a schematic view of an embodiment of the invention involving the use of a photoelectric cell to view the combined reflected light and indicate the differential pressure applied to the micromanometer.

Fig. 3 of the drawing shows a modified version of the micromanometer for increasing the sensitivity of the manometer portion of the instrument. Mirror 52 is positioned facing mirror 17 so light is reflected more than once through the liquid onto mirror 17, going through the liquid in leg 16 a number of times as indicated before being finally reflected up to combine with the second portion of the reflected light on the splitter plate. Obviously the sensitivity of the manometer will be increased by multiplying the number of times the light passes through the liquid layer to and from mirror 17.

The operation of the micromanometer will be described with relation to the embodiment shown in Fig. 1. Light source 35 is turned on. The micromanometer will first be allowed to come to constant temperature by circulation of water through jacket 14. Then, with no pressure applied to the micromanometer, the zero-level would be adjusted by screws 31 and/or 34. If necessary the operator would also adjust glass plate 41 until the "zero-order" fringe is centered horizontally as viewed on the ground glass plate and the fringes appear vertically in the center portion of the ground glass plate indicating that the fringes are formed from light reflected from the center step of mirror 40. Zero-level readings would then be taken on screws 31 and 34 and on dial 44.

The machine is now adjusted and ready for measuring the unknown pressure. In the specific measurement being discussed legs 16 and 20 will be the only ones used in the measurement. In such case valve 27 would be closed and valve 28 would be partially open so as to act as a damping means for pressure fluctuations applied to the system. The higher pressure would be applied to tube 21 leading into leg 16 and the lower pressure to tube 23. The operator would view through the viewing hood at the time of the application of the pressure and as the instrument tends to come to equilibrium under the applied pressure the operator would adjust screws 31 and/or 34 to adjust the level in compartments 16 and 20, and bring the level in compartment 16 up to zero-level as indicated by the position of the zero-order fringe viewed through the interferometer.

Alternatively, if the applied differential pressure to the manometer is small it would be possible by counting the number of interference fringes through the viewing hood to determine the differential pressure directly thereby without making any adjustments of screws 31 and 34.

As an alternative to adjusting screws 31 and/or 34 adjustment could be made of the length of liquid traversed by the light in cell 39 by the rack 42 and pinion 43. The operating knob for pinion 43 is extended through a sleeve in jacket 14 and container 13 to facilitate the use thereof. Adjustment of glass plate 41 would be made so the "zero-order" fringe would again appear centered on the ground glass plate when viewed through hood 47 of the interferometer and the differential pressure would be read on gage or dial 44.

Observation of fringes caused by light reflected from any of the various steps in mirror 40 would indicate the order of magnitude of the pressure difference and in what direction adjustment should be made by rack and pinion 42 and 43 or by screws 31 and 34 in order to shift the fringes into same position as they had before the pressure was applied.

If it was desired to increase the sensitivity of the interferometer portion of the micromanometer, screw 49 would be turned to tilt mirror 40 to a position as normal to the light rays falling thereon as possible, and this adjustment would tend to spread the interference fringes out as viewed through viewing hood 47. This tilting of the mirror should be done prior to final zero adjustment of the instrument, i. e., before pressure measurements.

With filter 36 positioned as it is, the picture presented in viewing hood 47 would be a split picture wherein one-half of the view would be furnished by the unfiltered white light wherein the "zero" fringe would be easier recognized, but the total number of interference fringes seen would not be nearly as great or as sharp as by the portion of the light furnished by the filter, which would tend to be monochromatic and yield a large number of fringes of nearly equal contrast. By such an arrangement as this, adjustment of the instrument to zero adjustment is facilitated while observing through viewing hood 47. In describing the operation as done immediately above, it had been assumed that the instrument was previously leveled both as to the container itself and mirror 17.

Although the invention has been described in terms of specific apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention or of the scope of the appended claims.

What I claim is:

1. A micromanometer comprising a container, a constant temperature jacket around said container, a first liquid-level measuring leg in said container, a first mirror positioned substantially horizontally in the liquid of said first leg, a second liquid-containing leg in said container, connecting means having damping means therein between said legs below the liquid levels therein so the liquid in each leg will tend to seek the same level, an interferometer positioned in said container, a light source for said interferometer, means to direct a first portion of the light from said light source in said first leg above the level of the liquid therein and through the liquid onto said first mirror, a second mirror as a part of said interferometer, means to direct a second portion of the light from said light source onto said second mirror, a liquid-containing cell positioned lengthwise in the path of the light to and from said second mirror, means to combine the reflected light from said mirrors, and means to view the combined reflected light from said mirrors as an indication of the differential pressure applied to the micromanometer.

2. The micromanometer of claim 1 wherein a filter is interposed in part of the light beam from said light source at a point where the light beam is undivided for the purpose of providing a split image of reflected light fringes a portion of which is provided by the filtered monochromatic light and the other portion is provided by the unfiltered white light.

3. The micromanometer of claim 1 wherein means are provided for adjusting the liquid levels an equal amount in said first and second legs and measuring the amount of adjustment thereof as an indication of the differential pressure applied to the micromanometer.

4. The micromanometer of claim 1 wherein said liquid-containing cell is adjustable in length, and means are provided for adjusting the length of said cell and measuring the change in length of said cell as a measure of the length of liquid through which the second light portion must pass in reaching said second mirror to provide an indication of the differential pressure applied to the micromanometer.

5. The micromanometer of claim 1 wherein said second mirror is composed of a multiplicity of parallel mirrored surfaces arranged consecutively by steps in different planes to aid in indicating whether the liquid in said first leg has been increased or decreased from the level when no differential pressure is applied to the micromanometer.

6. The micromanometer of claim 1 wherein means are provided to tilt said second mirror from the normal to the light falling thereon to change the sensitivity of the interferometer.

7. The micromanometer of claim 1 wherein a third mirror is positioned forcing said first mirror above the liquid level in said first leg to cause the first light portion to pass in and out of the liquid a multiplicity of times thereby increasing the sensitivity of the micromanometer.

8. The micromanometer of claim 1 wherein said means to view the combined reflected light from said mirrors is a photoelectric means.

9. The micromanometer of claim 1 wherein more than one liquid-containing leg is provided to surround said first leg, and means having damping means therein is provided connecting each of the surrounding legs with said first leg below the liquid levels in said leg so the liquid in each leg will tend to seek the same level.

10. The micromanometer of claim 1 wherein as a part of the container forming the manometer portion of the micromanometer top and bottom compartmentation are concave for greater structural strength.

11. A micromanometer comprising a container, a constant temperature jacket around said container, a first liquid-level measuring leg in said container, a first mirror positioned substantially horizontally in the liquid in said first leg, second and third liquid-containing legs surrounding said first leg in said container, valved connecting means joining the three legs below the liquid levels therein, means for adjusting the liquid levels an equal amount in the three legs and measuring the amount of level adjustment as an indication of the differential pressure applied to the micromanometer, an interferometer positioned in said container, a light source for said interferometer, means to direct a first portion of the light from said light source into said first leg above the liquid level therein and through the liquid onto said first mirror, a liquid-containing cell in said container, a second mirror composed of a multiplicity of parallel mirrored surfaces arranged consecutively by steps in different planes and located in said cell in the liquid therein, means to direct a second portion of the light from said light source through the liquid in said cell onto said second mirror, means to tilt said second mirror from the normal to light falling thereon to change the sensitivity of the interferometer, means for adjusting and measuring the length of liquid traversed by the second light portion in reaching said second mirror as an indication of the differential pressure applied to the micromanometer, a filter interposed part of the light beam from said light source at a point where the light beam is undivided for the purpose of providing monochromatic light to be seen simultaneously with unfiltered light, means to combine the reflected light from said mirrors, and means to view the combined reflected light from said mirrors for the purpose of determining the differential pressure applied to the micromanometer.

12. The micromanometer of claim 10 wherein leveling means are provided for said first mirror as an aid in adjusting the sensitivity of said interferometer.

References Cited in the file of this patent
UNITED STATES PATENTS

| | | |
|---|---|---|
| 1,044,502 | Crehore et al. | Nov. 19, 1912 |
| 1,761,295 | Greenfield | June 3, 1930 |
| 1,832,826 | Weyrick | Nov. 17, 1931 |
| 1,917,846 | Klopsteg | July 11, 1933 |
| 2,256,804 | Hurley | Sept. 23, 1941 |
| 2,617,305 | Dahm et al. | Nov. 11, 1952 |
| 2,701,961 | Svensson | Feb. 15, 1955 |
| 2,734,419 | Hendrix | Feb. 14, 1956 |